3,481,908
TERPOLYMERS OF ETHYLENE, A MONO-OLEFIN, AND AN UNSATURATED AMIDE
George A. Mortimer, La Marque, Tex., assignor to Monsanto Company, St. Louis, Mo., a corporation of Delaware
No Drawing. Filed Aug. 2, 1965, Ser. No. 476,647
Int. Cl. C08f 15/40
U.S. Cl. 260—80.73                13 Claims

ABSTRACT OF THE DISCLOSURE

Substantially random solid addition terpolymers of ethylene, a mono-olefin, and an unsaturated amide prepared by polymerization at elevated temperatures and pressures in the presence of a free-radical-generating catalyst.

---

This invention relates to new polymeric compositions and, more particularly, to interpolymers of ethylene with α-olefins and polymerizable unsubstituted and substituted acrylamides and methacrylamides and to a method for their preparation.

High-molecular-weight solid polymers of ethylene are well known in the art. These polymers have a wide range of physical characteristics and chemical properties which make them useful for many purposes. They can be produced by subjecting ethylene to polymerization at elevated pressures from 5,000 to 60,000 p.s.i.g. and elevated temperatures from 100° to 400° C. in the presence of free-radical initiators for the polymerization reaction. The properties of the polymers can be "tailored," so to speak, to a degree by varying polymerization conditions, using different initiators, etc. Variation in polymer properties such as density, molecular weight, melt index, tensile strength, stiffness and surface appearance can also be obtained by the use of compounds known as "modifiers" in the polymerization reaction and/or by polymerizing the ethylene with small amounts of comonomers. It has been proposed heretofore, for example, to polymerize ethylene in admixture with one or more other olefins such as propylene, butene-1 and the like to produce polymeric products which are tougher than polyethylene and from which thin blown films can be made which have less haze than do thin films of polyethylene. While the resulting copolymers are satisfactory for some purposes, they are inadequate for others because of their lack of the requisite toughness and stiffness. It has now been discovered that the addition of certain unsubstituted or substituted acrylamides and methacrylamides as a third component in ethylene-olefin polymer compositions results in a polymeric product which is tougher than ethylene-olefin copolymers. Thick specimens of the ethylene-olefin-acrylamide terpolymers have a transparency substantially equivalent to polyethylene films whereas specimens of polyethylene and ethylene-olefin copolymers of comparable thickness are opaque. The terpolymers are also stiffer than the prior art copolymers when a sufficient amount of the amide component is present. Particularly noteworthy is the enhanced stiffness, since ordinarily only small amounts of other olefins can be copolymerized with ethylene to obtain the desired modified properties in the resulting polymer. The use of amounts outside the rather narrow ranges disclosed as suitable adversely affects the rigidity of the polymers leading to rubber-like materials.

It is, accordingly, an object of the present invention to provide novel, solid interpolymers of ethylene with a high degree of toughness. Another object of the invention is to provide interpolymers of ethylene characterized by high toughness and having a stiffness comparable to or better than that of polyethylene made under the same conditions. Still another object of the invention is to provide stiff, tough, interpolymers of ethylene which are characterized by high transparency and are eminently suitable for use in the production of high-impact films and transparent molded objects.

These and other objects and advantages of the invention which will become apparent from the following description thereof are obtained by interpolymerizing ethylene, a monoolefinic hydrocarbon having from 3 to 18 carbon atoms, and an amide of the formula

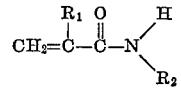

wherein $R_1$ may be hydrogen or a methyl group and $R_2$ may be hydrogen or an alkyl, hydroxyalkyl or aryl radical having up to 8 carbon atoms.

As examples of the monoolefins which can be interpolymerized with ethylene and the defined amides to produce the novel and improved interpolymers of the invention there may be mentioned propylene, butene-1, isobutylene, pentene-1, hexene-1, octene-1, 3-methyl-1-butene, 3,3-dimethyl-1-butene, 4-methyl-1-pentene, 4,4-dimethyl-1-pentene, 3-methyl-1-pentene, 3,3-dimethyl-1-pentene, decene-1, 5-methyl-1-heptene, octadecene-1 and the like.

Specific examples of the amides useful as the third monomer for producing the interpolymers of the invention include acrylamide, N-methylacrylamide, N-ethylacrylamide, N-propylacrylamide, N-isopropylacrylamide, N-tert-butylacrylamide, N-amylacrylamide, N-tert-octylacrylamide, N-decylacrylamide, N-hydroxymethylacrylamide, N-hydroxyethylacrylamide, N-hydroxypropylacrylamide, N-phenylacrylamide, N-o-tolylacrylamide, N-p-tolylacrylamide, N-naphthylacrylamide, and the like as well as methacrylamide and all of the corresponding substituted methacrylamides.

In general, the interpolymers of the invention should contain at least 50 mole percent of ethylene. Usually, amounts of ethylene range from about 70% to about 98.5% with those from about 85% to 98% being preferred. The monoolefin is present in amounts from about 1 to about 10 mole percent with those in the range from about 1 to about 5 mole percent being preferred. The amount of the unsaturated amide which constitutes the third component of the novel interpolymers of this invention may vary in the range from about 0.5 to about 20 mole percent of the interpolymer composition. Preferably, the quantity of the amide comonomer is from about 1 to about 10 mole percent.

The polymerization process by which the interpolymers are produced is conducted at superatmospheric pressures from about 5,000 p.s.i.g. up to as high as 60,000 p.s.i.g. Preferably, the pressures employed are in the range from about 20,000 to about 35,000 p.s.i.g.

While the temperature of the polymerization process may be varied over the range from about 100° to about 400° C., preferred temperatures are those from about 130° to about 300° C.

Any of the well known free-radical initiators used for catalyzing the polymerization of ethylene can be employed for producing the novel interpolymers herein described. Among these may be mentioned molecular oxygen; per-oxygen type compounds such as hydrogen peroxide, dialkyl dioxides such as diethyl peroxide and di-tert-butyl peroxide, diacyl peroxides such as lauroyl peroxide and benzoyl peroxide, alkyl hydroperoxides such as tert-butyl hydroperoxide, diperoxy dicarbonate esters such as diisopropylperoxy dicarbonate, tert-alkyl percarboxylates such as tert-butylperbenzoate, persulfates such as potassium persulfate, peracids such as peracetic acid and the like; azo-type compounds such as azo-bis (isobutyronitrile); azines such as benzalazine; oximes such as acetone oxime; etc. Particularly suitable are peroxides such as di-tert-butyl peroxide, for example. Only small amounts of the initiator are required. Generally, initiator concentration will vary from about 0.0005% to about 2% of the total weight of the monomers charged to the polymerization reactor.

So-called polymerization "modifiers" or chain-transfer agents can also be employed in the manufacture of the interpolymers of the invention, if desired, to obtain certain polymer properties which such modifiers or chain-transfer agents may impart. Examples of compounds in general use in the art for this purpose are aliphatic alcohols containing one to ten carbon atoms and preferably three to five carbon atoms such as methanol, propanol, isobutanol, hexanol and decanol; aliphatic saturated ketones containing three to ten carbon atoms and preferably three to five carbon atoms such as acetone, diethyl ketone, methyl isopropyl ketone and the like; saturated aliphatic aldehydes containing one to eight carbon atoms and preferably two to five carbon atoms such as formaldehyde, acetaldehyde, butyraldehyde and the like; saturated hydrocarbons such as ethane, propane, cyclohexane and the like; aromatic hydrocarbons such as toluene, xylene and the like; chlorinated hydrocarbons such as chloroform, carbon tetrachloride and the like; and hydrogen.

The polymerization process may be either a batch or a continuous one. The preferred method is the continuous type of operation wherein ethylene, the other monomers, initiator, and modifier, if one is used, are charged to a reactor maintained under suitable conditions of temperature and pressure, interpolymer is continuously separated from the reactor effluent, and unreacted monomers, initiator, and modifier, if any, are recycled to the reactor.

The invention is illustrated in the following examples which, however, are not to be construed as limiting it in any manner whatsoever. All percentages given therein are on a molar basis unless otherwise indicated, except conversion which is given in weight percent.

reached about 7500 p.s.i. at the temperature level of 130° C. Then, the mechanical agitator inside the bomb was activated and the normally liquid feeds, i.e., the amide solution and di-tert-butyl peroxide initiator (DTBP) dissolved in benzene, were forced from a small cold compartment of the bomb where they had been stored free of air or oxygen contamination into the reaction chamber by means of high pressure ethylene charged until a final pressure of 20,000 p.s.i. at 130° C. was attained. After the desired reaction time, the bomb was depressurized and the polymer product was recovered and its physical properties determined.

A summary of reaction conditions for the various runs made is presented in Table I below and the physical properties determined for the interpolymers produced under these conditions are presented in Table II. The methods used for the determination of melt index and density are described in J. App. Polymer Sci., 8, 839 (1964) and J. Polymer Sci., A-2, 1301 (1964), respectively. All other evaluations were performed on nominally 20-mil thick specimens. A standard procedure, ASTM D-1822 61 T, was followed for the tensile impact test using the "S" specimen. The "L" specimen of that procedure was used for slow speed testing. It was pulled at 2 in./min. in an Instron tensile testing machine until the sample failed. From the force curve, the modulus (5% secant), tensile at yield, and tensile at fail were calculated based on the dimensions of the unextended specimen. Haze was also determined on 20-mil specimens using Procedure A of ASTM D-1003-61, where lower values indicate a more transparent, less hazy sample.

The propylene used in these runs was labeled with $C^{14}$, therefore, the propylene content of the polymers was determined by scintillation counting. The amide content of the polymers was calculated from the nitrogen content as determined by combustion analysis.

From the data in Table II, it is readily apparent that the addition of acrylamide or a substituted acrylamide to an ethylene-propylene copolymer increased the ultimate tensile strength, increased the impact resistance and in some instances made the polymer essentially transparent.

TABLE I

| Run No. | DTBP, moles/l. | Feed Composition | | | | | | Reaction Time (min.) | Weight Percent Conv. |
|---|---|---|---|---|---|---|---|---|---|
| | | Ethylene, Percent | Propylene, Percent | Amide Used | Amide, Percent | Methanol, Percent | Benzene, Percent | | |
| 1 | 2.1×10⁻⁴ | 95.3 | 4.4 | None | | 0.0 | 0.3 | 85 | 5.2 |
| 2 | 4.1×10⁻⁴ | 94.9 | 3.9 | Acrylamide | 0.2 | 0.9 | 0.2 | 59 | 4.6 |
| 3 | 6.2×10⁻⁴ | 95.4 | 3.9 | N-hydroxymethylacrylamide | 0.1 | ¹ 0.0 | 0.2 | 48 | 4.4 |
| 4 | 4.1×10⁻⁴ | 95.1 | 3.9 | N-isopropylacrylamide | 0.2 | 0.6 | 0.2 | 83 | 6.6 |
| 5 | 10.3×10⁻⁴ | 93.3 | 3.4 | N-phenylacrylamide | 0.2 | 2.9 | 0.3 | 47 | 2.5 |

¹ 0.5% H₂O used.

TABLE II

| Run No. | Polymer Composition (Percent) | | | Melt Index (dg./min.) | Density, g./cc. | Modulus, p.s.i. | Tensile Yield, p.s.i. | Tensile Fail, p.s.i. | Tensile Impact, p.s.i. | Haze, Percent |
|---|---|---|---|---|---|---|---|---|---|---|
| | C₂H₄, Percent | Propylene, Percent | Amide Percent | | | | | | | |
| 1 | 98.2 | 1.8 | 0.0 | 2.3 | .927 | 1,420 | 1,700 | 2,630 | 45 | 66 |
| 2 | 97.2 | 1.6 | 1.2 | 1.7 | .929 | 1,400 | 1,610 | 3,040 | 135 | 57 |
| 3 | 97.6 | 1.7 | 0.7 | 0.4 | .929 | 1,330 | 1,560 | 3,000 | 119 | 75 |
| 4 | 95.9 | 1.8 | 2.3 | 1.6 | .926 | 1,220 | 1,410 | 4,140 | 341 | 6 |
| 5 | 93.7 | 1.4 | 4.9 | 1.1 | .969 | (¹) | (¹) | (¹) | (¹) | 18 |

¹ Not measured.

Example 1

A series of experiments were conducted in which ethylene and propylene, together with small amounts of acrylamide or an N-substituted acrylamide, were polymerized. In each experiment, a steel reaction bomb together with all accessory lines thereto was carefully cleaned and flushed with ethylene to eliminate all traces of air or oxygen. The normally gaseous feed materials, i.e., propylene plus some ethylene were introduced into the reaction chamber of the bomb heated to the reaction temperature of 130° C. at atmospheric pressure until the pressure increased to about 700 p.s.i. Thereafter, additional hot ethylene was pumped into the bomb until the pressure

Example 2

The procedure of Example 1 was used to polymerize together 87.1% ethylene and 2.1% isobutylene-$C^{14}$ in the presence of 10.7% propane as a modifier and 2.1×10⁻⁴ mole/liter of di-tert-butyl peroxide as initiator for 65 minutes. A 4.0 wt. percent conversion of a copolymer was obtained which had the following properties: isobutylene content 1.0%, melt index 22, haze 64%.

Example 3

The procedure of Example 1 was again repeated with a reaction feed consisting of 97.0% ethylene, 2.3% isobutylene-$C^{14}$, and 0.2% N-isopropylacrylamide with 0.4% methanol as modifier and $4.13 \times 10^{-4}$ mole/liter of di-tert-butyl peroxide initiator for 55 minutes. A 7.2 wt. percent conversion of a terpolymer was obtained which had the following properties: isobutylene content 1.2%, N-isopropylacrylamide content 1.5%, melt index 1.0, haze 6.5%. As the haze data indicate, this polymer was transparent whereas that of Example 2 was opaque.

Example 4

The procedure of Example 1 was carried out using a feed consisting of 96.8% ethylene and 3.1% 4,4-dimethylpentene-1 with $2.2 \times 10^{-3}$ mole/liter of di-tert-butyl peroxide for 55 minutes. Conversion was 8.8 wt. percent. From the reactivity ratios for $\alpha$-olefins published in J. Polymer Sci., 61, 3 (1962), the polymer was calculated to contain 1.0% 4,4-dimethylpentene-1. The polymer had the following properties: melt index 0.8, modulus 1250 p.s.i., density 0.925 g./cc., tensile at yield 1590 p.s.i., tensile at fail 4210 p.s.i., tensile impact 349, haze 70%.

Example 5

Following the procedure of Example 1, a feed consisting of 89.9% ethylene, 2.4% 4,4-dimethylpentene-1, and 0.6% N-tert-butylacrylamide was polymerized with 7.0% methanol as modifier and $1.03 \times 10^{-3}$ mole/liter di-tert-butyl peroxide for a period of 20 minutes. Conversion was 4.8 wt. percent. From the reactivity ratios for $\alpha$-olefins and from elemental analysis, the polymer composition was determined to be 1.0% 4,4-dimethylpentene-1 and 7.4% tert-butylacrylamide. The polymer properties were as follows: melt index 4.9, modulus 2900 p.s.i., density 0.930 g./cc., tensile at yield 2020 p.s.i., tensile at fail 4780 p.s.i., tensile impact 263, haze 9%. Because of the low extensibility of the polymer before yielding, the modulus was determined by extrapolating the initial portion of the stress-strain curve to 5%.

From Examples 4 and 5, it can be seen that the incorporation of a substantial amount of an acrylamide in an ethylene-olefin copolymer results in a terpolymer having increased stiffness over the olefin-ethylene copolymer and confers a greater ultimate strength and transparency to the polymeric product.

The interpolymers of the invention are useful per se in many applications or they may also be blended with other thermoplastic polymers to produce films, moldings, bottles and the like. Fillers, reinforcing agents such as fibrous materials and foaming agents may be added to the interpolymers to render them suitable for particular applications. The properties of the interpolymers can be preserved or enhanced by the addition of stabilizing agents and pigments may be added to the interpolymers to obtain colored compositions.

What is claimed is:

1. Substantially random solid addition interpolymers consisting essentially of at least 50 mole percent of ethylene, a monoolefinic hydrocarbon having from 3 to 18 carbon atoms, and an amide of the formula

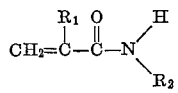

wherein $R_1$ is selected from the group consisting of hydrogen and the methyl radical and $R_2$ is selected from the group consisting of hydrogen and alkyl, hydroxyalkyl and aryl radicals having up to 8 carbon atoms.

2. Substantially random solid addition interpolymers consisting essentially of from about 70 to about 98.5 mole percent of ethylene, from about 1 to about 10 mole percent of a monoolefinic hydrocarbon having from 3 to 18 carbon atoms, and from about 0.5 to about 20 mole percent of an amide of the formula

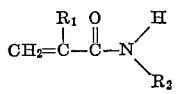

wherein $R_1$ is selected from the group consisting of hydrogen and the methyl radical and $R_2$ is selected from the group consisting of hydrogen and alkyl, hydroxyalkyl, and aryl radicals having up to 8 carbon atoms.

3. Substantially random solid addition interpolymers consisting essentially of from about 85 to about 98 mole percent of ethylene from about 1 to about 5 mole percent of a monoolefinic hydrocarbon having from 3 to 18 carbon atoms, and from about 1 to about 10 mole percent of an amide of the formula

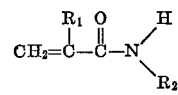

wherein $R_1$ is selected from the group consisting of hydrogen and the methyl radical and $R_2$ is selected from the group consisting of hydrogen and alkyl, hydroxyalkyl and aryl radicals having up to 8 carbon atoms.

4. The interpolymers of claim 3 wherein said monoolefinic hydrocarbon is propylene.

5. The interpolymer of claim 4 wherein said amide is acrylamide.

6. The interpolymer of claim 4 wherein said amide is N-isopropylacrylamide.

7. The interpolymers of claim 3 wherein said monoolefinic hydrocarbon is isobutylene.

8. The interpolymer of claim 7 wherein said amide is N-isopropylacrylamide.

9. The interpolymers of claim 3 wherein said monoolefinic hydrocarbon is 4,4-dimethylpentene-1.

10. The interpolymer of claim 9 wherein said amide is N-tert-butylacrylamide.

11. The process of producing substantially random solid addition interpolymers of ethylene which comprises polymerizing ethylene with a monoolefinic hydrocarbon having from 3 to 18 carbon atoms and an amide of the formula

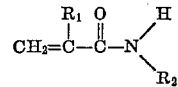

wherein $R_1$ is selected from the group consisting of hydrogen and the methyl radical and $R_2$ is selected from the group consisting of hydrogen and alkyl, hydroxyalkyl, and aryl radicals having up to 8 carbon atoms at a pressure from about 5,000 p.s.i.g. to about 60,000 p.s.i.g. and a temperature from about 100° C. to about 400° C. in the presence of an amount of a free-radical-generating compound sufficient to initiate the polymerization.

12. The process of producing substantially random solid addition interpolymers of ethylene which comprises polymerizing ethylene with propylene and an amide of the formula

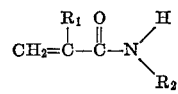

wherein $R_1$ is selected from the group consisting of hydrogen and the methyl radical and $R_2$ is selected from the group consisting of hydrogen and alkyl, hydroxyalkyl, and aryl radicals having up to 8 carbon atoms at a pressure from about 20,000 to about 35,000 p.s.i.g. and a temperature from about 130° to about 300° C. in the presence of an amount of a dialkyl dioxide sufficient to initiate the polymerization.

13. The process of claim 12 wherein said amide is N-isopropylacrylamide and said dialkyl dioxide is di-tert-butyl peroxide.

References Cited

UNITED STATES PATENTS

| | | | |
|---|---|---|---|
| 2,396,785 | 3/1946 | Hanford | 260—78 |
| 2,405,962 | 8/1946 | Larson | 260—88.1 |
| 3,366,605 | 1/1968 | Seiner | 260—72 |
| 3,278,495 | 10/1966 | Hagel | 260—78.5 |
| 3,402,098 | 9/1968 | Baum | 161—190 |

JOSEPH L. SCHOFER, Primary Examiner

ROGER S. BENJAMIN, Assistant Examiner

U.S. Cl. X.R.

260—80.78